United States Patent [19]

Bright

[11] Patent Number: 4,761,232
[45] Date of Patent: Aug. 2, 1988

[54] MACROPOROUS SUBSTRATE CONTAINING MICROPOROUS MATRIX

[75] Inventor: Donald G. Bright, Tyrone, Ga.

[73] Assignee: Porex Technologies Corp. of Georgia, Fairburn, Ga.

[21] Appl. No.: 837,182

[22] Filed: Mar. 7, 1986

[51] Int. Cl.$^4$ .............................................. B01D 13/00
[52] U.S. Cl. ........................... 210/500.36; 210/500.42
[58] Field of Search .................. 210/500.23, 490, 491, 210/500.36, 433.2, 654, 500.42; 428/304.4, 315.5, 316.6; 264/41, 45.1

[56] References Cited

U.S. PATENT DOCUMENTS

| 4,214,020 | 7/1980 | Ward et al. | 210/500.23 X |
| 4,377,481 | 3/1983 | Jakabhazy | 210/500.35 |
| 4,473,475 | 9/1984 | Barnes, Jr. et al. | 210/639 X |

FOREIGN PATENT DOCUMENTS

| 0064677 | 6/1978 | Japan | 210/500.42 |
| 0113809 | 7/1982 | Japan | 210/500.42 |

*Primary Examiner*—Frank Spear
*Attorney, Agent, or Firm*—Lane and Aitken

[57] ABSTRACT

In a porous structure, a macroporous polyethylene substrate defining a network of interconnecting macropores and a microporous matrix of polyvinyl chloride is formed within and completely fills the network of macropores. The microporous matrix is cast within the network of macropores by impregnating the macropores with a solution of a solvent, a polymeric pore former, and polyvinyl chloride. The solution is caused to imbibe water from the atmosphere so as to separate into two liquid phases, one phase being rich in the polyvinyl chloride and the other phase being rich in water. The microporous matrix is coagulated from the first phase and the solvent and pore former are extracted from the macroporous matrix.

12 Claims, 1 Drawing Sheet

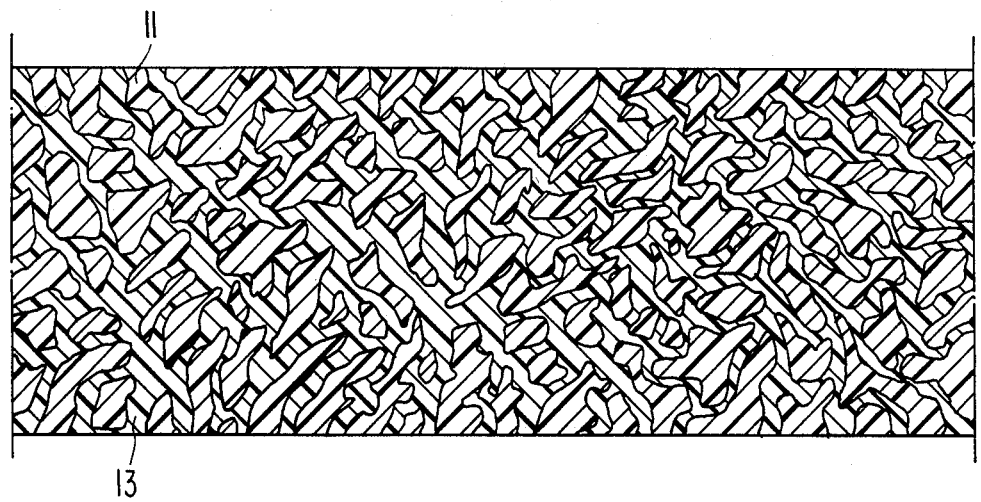

MACROPOROUS SUBSTRATE CONTAINING MICROPOROUS MATRIX

BACKGROUND OF THE INVENTION

This invention relates to porous structures and more particularly, to microporous structures made from synthetic resin.

Microporous structures, usually in the form of membranes, have a high degree of utility in filtration which is a very important industrial process. For example, filtration is used in the clarification and cleaning of fluids, in gasification and degasification, in biological waste treatment, in waste water treatment, in oil and water separation processes, in oil reclamation processes, and in air analysis including purification, dust collection, aerosol filtration, and oil entrapment. Since the microporous structures used for filtration are usually in the form of thin membranes, they have very little structural strength, which limits how the membranes can be used. For example, because of their lack of strength, membrane filters cannot be easily back flushed. Also, membrane filters are primarily surface filters in which the filtered residue is separated from the filtrate at the surface of the filter, as opposed to depth filtration wherein the filtered residue is accumulated in the body of the filter.

Filtration with membranes is a useful process, when solid particles are being filtered out from a fluid and it is desired to accumulate the filtered residue as a filter cake on the surface of the filter. However, when such a filter cake is formed, it would be advantageous to separate the filter cake from the membrane by back flushing the filter, but because of the lack of mechanical strength of the membrane, separation by back flushing is difficult to accomplish.

SUMMARY OF THE PRESENT INVENTION

The present invention improves over the prior art membrane filters by having a high degree of mechanical strength and thus, overcomes the disadvantages of the membrane filter associated with their lack of strength. In addition, the microporous filter structure of the present invention can be used for depth filtration as well as microfiltration.

In accordance with the present invention, a macroporous substrate made of a synthetic resin and having interconnecting pores extending throughout the substrate is provided. Filling the pores of the macroporous substrate is a microporous material similar to the membrane materials of the prior art. The microporous material is formed filling the pores of the macroporous substrate by casting the microporous material within the pores of the substrate. To carry out this casting process, the pores of the macroporous substrate are filled with a solution of a first polymer, a solvent, and a water soluble pore former. The first polymer is caused to coagulate around the pore former, and the pore former and the solvent are then extracted leaving a microporous material filling the pores of the macroporous substrate.

BRIEF DESCRIPTION OF THE DRAWING

The single FIGURE of the drawing schematically illustrates an enlarged sectional view of the porous structure of the present invention.

DESCRIPTION OF THE PREFERRED EMBODIMENTS

As shown in the drawing, the microporous structure of the present invention comprises a macroporous substrate 11 made of a synthetic resin such as polyethylene, defining a network of interconnecting macropores. "Macroporous" as used herein, means having pores which are macroscopic, that is greater than 10 microns in diameter. "Macropore" as used herein, means a macroscopic pore. Within and filling the interconnecting network of macropores, is a microporous matrix 13 of synthetic resin material such as the polymer, polyvinyl chloride. The microporous matrix 13 defines a network of interconnecting micropores. As used herein, "microporous" means having pores which are microscopic, that is less than 10 microns in diameter and "micropore" means microscopic pore. In order for the micropores to effectively form an interconnecting network in the macroporous pore volume, it is necessary for the macropores of the substrate 11 to be at least three times the size of the micropores of the microporous matrix 13 and preferably be on the order of at least 10 times the size of the micropores.

The macroporous substrate is formed by sintering particles of powdered synthetic resin material of the substrate together. The powdered synthetic material is filled into a mold, and compressed and heated to sinter the particles of powder into the porous mass of the substrate. U.S. Pat. No. 3,051,993 to Goldman discloses the details of a method of making a polyethylene macroporous substrate.

After the macroporous substrate has been formed, the microporous synthetic resin material is cast within the void volume of the macroporous substrate. This is accomplished by fully impregnating the void volume with a solution of the synthetic resin material which is to become the microporous matrix, a solvent, and a water soluble polymeric pore former. After the void volume of the substrate has been fully impregnated with the solution, the solution is allowed to stand in the void volume in a stagnant atmosphere at a controlled temperature and relative humidity for a period of time during which moisture from the atmosphere is imbibed by the solution. Also, during this time essentially no evaporation of the membrane solvent occurs. In the solution, the solvent is preferential to the imbibed water. As a result, with time, the membrane solution undergoes phase inversion, in which it separates into two liquid phases, one phase being rich in the microporous resin material and pore former material and the other phase being rich in water and solvent. After this phase inversion, the substrate with the phase inverted solution fully impregnating the macropores of the substrate is immersed in a water bath, which causes the microporous resin material to coagulate into a microporous matrix. Continued immersion in the bath results in extraction of the pore former and the solvent leaving the microporous matrix formed within and filling the network of macropores in the substrate. After the pore former and solvent have been extracted, the substrate with the macroporous interconnecting pores filled with the microporous matrix is air dried.

The substrate may be in the form of a macroporous sheet for example, 1/16 of an inch thick, in which case, the sheet is placed on a moving metallic belt or alternatively placed on a stationary surface, preferably metal or glass, the temperature of which is maintained at 90° to 95° F. If the pore distribution in the substrate is asymmetric relative to pore size, the more open or porous size of the substrate should face upwards with the less open or porous side in contact with the supporting surface. The microporous matrix forming solution is distributed upon the porous surface in a quantity sufficient to fully impregnate the substrate through to the bottom surface without leaving a layer of the solution on top or bottom of the substrate. A Gardner Doctor Blade is used to spread and lay down the solution and to insure a uniform impregnation of the substrate. A second Gardner Doctor Blade is employed to remove any excess solution from the upper substrate surface. After the substrate has been impregnated in this manner, the microporous matrix is then caused to form from the solution as described above.

It is important that all of the excess solution be removed from the surface of the substrate, so that the microporous matrix, which is formed is entirely within the pores of the macroporous substrate and that the external boundary of the microporous matrix is coextensive with or within the boundary defined by the external surface of the macroporous substrate. Because the boundary of the microporous matrix is coextensive with or within the boundary defined by the external surface of the porous substrate, the surface of the microporous matrix is protected from damage which can occur in handling. Moreover, if a layer of the microporous matrix were allowed to form outside of the boundary of the macroporous substrate, the resulting structure would operate primarily only as a surface filter as opposed to a depth filter. When the external boundary of the microporous matrix is coextensive with or within the boundary of the macroporous substrate, the size of the largest pores of the microporous matrix, as measured by the bubble test, will be greater than they would be in a layer of the microporous material formed outside the boundary of the substrate. This characteristic is what enables the structure to function better as a depth filter with the matrix of microporous material formed entirely within the external boundary of the macroporous substrate. In addition, the distribution of the pore sizes in the microporous matrix within the substrate are greater than they would be in a layer of microporous material formed external to the boundary of the substrate. A greater distribution of pore size provides a higher flow rate for a given filtration efficiency.

The substrate instead of being a flat sheet, can also a molded configuration such as tubular or any desired shape not suitable to be laid flat upon a flat surface. When such a molded configuration is employed as the substrate, the molded substrate is immersed in a reservoir of the solution which is to fill the pores of the substrate. The reservoir is sealed and evacuated for a period of about fifteen minutes and the vacuum pressure within the reservoir is oscillated between 10 and 25 inches of mercury every five minutes. This oscillation withdraws air trapped in the void volume of the substrate and allows the solution to be forced into the void volume by means of the pressure differential created by the oscillation of the vacuum pressure. After the pore volume becomes saturated with the solvent, excess solution is removed from the surface of the molded substrate and the microporous matrix is formed from the solvent within the network of macropores in the substrate. Saturation of the substrate will be evident when the opaque substrate turns somewhat translucent.

In specific examples of the invention, the macroporous substrate is polyethylene having an average pore size ranging from 74 microns to 140 microns in diameter and having a pore volume ranging from 34% to 46%. The microporous matrix filling the network of any interconnected macropores in the substrate is polyvinyl chloride ranging from less than 0.2 microns to greater than 5 microns in diameter. Examples I through IV given below indicate specific compositions for the casting solution, which is impregnated into the network of interconnecting macropores of the macroporous substrate to form the microporous matrix filling the network of macropores. In the examples, the amounts of the constituents of the solutions are in parts by weight.

EXAMPLE I 4.4 parts polyvinyl chloride, molecular wt 115K, supplied by BF Goodrich under identification #125 (microporous matrix polmer)

75.6 parts N,N dimethyl formamide, provided by Ashland. (solvent)

20 parts polyethylene glycol, provided by Union Carbide under identification #3350. (pore former)

The above solution if cast as microporous membrane matrix provides a 5.0 um nominally rated pore size in the membrane matrix.

EXAMPLE II 1.6 parts polyvinyl chloride, molecular weight 303K, provided by BF Goodrich under identification #121

3.4 parts polyvinyl chloride, molecular weight 115K, provided by BF Goodrich under identification No. #125

75 parts N,N dimethyl formamide provided by Ashland 20 parts polyethylene glycol, provided by Union Carbide under identification #8000

This solution if cast as a microporous membrane matrix provides a 0.8 um nominally rated pore size in the membrane matrix.

EXAMPLE III 7.5 parts polyvinyl chloride, molecular weight 115K, provided by BF Goodrich under identification #125

72.5 parts N,N dimethyl formamide, provided by Ashland.

20.0 parts polyethylene glycol, provided by Union Carbide under identification #8000

This solution if cast as a microporous membrane matrix provides a 0.45 um nominally rated pore size in the membrane matrix.

EXAMPLE IV 4.1 parts polyvinyl chloride, molecular weight 303k, provided by BF Goodrich under identification #121

3.4 parts polyvinyl chloride, molecular weight 115K, provided by BF Goodrich under identification #125

72.5 parts N,N dimethyl formamide, provided by Ashland 20.0 parts polyethylene glycol, provided by Union Carbide under identification #8000.

This solution if cast as a microporous membrane matrix provides a 0.2 um nominally rated pore size in the membrane matrix.

In each of the examples, to mix the casting solution, the polyvinyl chloride and the pore former are sifted into separate containers. The polyvinyl chloride is dried for 12 hours at 150° F. to remove moisture. The polymer is then resifted into a moisture proof holding container. The solvent is poured into a mixing vessel such as a blender provided with a jacket for surrounding it with a constant temperature bath. The blender used in the examples is Waring Laboratory Blender with a one quart stainless steel mixing vessel having a maximum no-load speed of 13,000 rpm. After the solvent has been poured into the mixing vessel, circulation of water through the jacket of the blender at a temperature of 115° to 120° F. at a circulation rate of 1 liter per minute is started. The polyvinyl chloride is then slowly added to the solvent while continuously agitating the solvent by running the blender at half speed. The polymer is then blended with the solvent for 17 minutes while agitating the mixture by running the blender at full power to dissolve the polymer into the solvent. The agitation is then again reduced to half speed and the pore former, polyethylene glycol, is added to the solution slowly and continuously while the low degree of agitation is maintained. Then the mixture is blended at full power for 17 minutes to dissolve the pore former into the solution. After the blending is completed, the solution is poured into a clean dry container and the temperature of the solution is measured, which should be between 120° and 130° F. The container is then sealed and placed in a constant temperature oven at a 100° F. for at least 6 hours to deaerate and age.

The casting solution at a temperature of 100° F. is then impregnated into the network of macropores. Then the solution is allowed to stand in place filling the network of macropores in the substrate while water is imbibed from the atmosphere in a controlled environment in which temperature is maintained at 80° to 85° F., the relative humidity is maintained at 80 to 85%, and the environment is maintained stagnent. The solution is let stand for a period of 30 minutes under these conditions while the imbibing of water by the solution from the atmosphere takes place. Essentially no evaporation of the solvent from the casting solution occurs. Phase inversion starts after about 3 to 4 minutes. When the 30 minute period is up, the substrate with the phase inversion solution is immersed in a bath of filtered water at a temperature between 90° and 95° F. for a time period sufficient to extract the pore former and the solvent from the microporous matrix. The resulting structure is then allowed to dry under ambient room temperature conditions for a time period necessary to complete the drying.

When the casting solution of example I was cast into a macroporous substrate in the form of a sheet 1/16" thick and having an average pore size of 74 microns with a pore volume of 34%, in accordance with the above described process, the resulting structure was hydrophobic and exhibited a bubble point pressure of 15" of water using #4 fuel oil as the bubble point fluid. The bubble point pressure as a measurement from a standard test adopted by the American Society of Testing and Materials in 1970 and is described in the annual book of ASTM standards published in 1970. In addition, the structure exhibited an air flow rate of 1.2 standard cubic feet per minute and the water flow rate of 0.04 gallons per minute, both measured through a circular area of 25 millimeters in diameter with a pressure differential of 10 lbs. per square inch. The filtration efficiency was measured to be 58.4% on a standard filtration test mixture. The standard filtration test mixture consisted of 1½ grams of fine Arizona road dust and 1 liter of water. The Arizona road dust particle size in the test mixture is distributed as follows:

0–5 um: 39%±2%
5–10 um: 18%±3%
10–20 um: 16%±3%
26–40 um: 18%±3%
40–80 um: 9%±3%

The casting solution may be diluted by a diluent in which the synthetic resin, which is to become the microporous matrix is not soluble and in which the pore former is only slightly soluble. The diluent should be homogenously miscible with the solvent. The preferred diluent is acetone. Other diluents which may be used are low molecular weight alcohols, e.g. ethyl alcohol, methyl alcohol, and isopropyl alcohol. When the casting solution is diluted by a diluent, the average pore size in the microporous matrix is increased. The casting solution, consisting of the synthetic resin, which is to become the microporous matrix, the pore former and the solvent, can be diluted by the diluent so that the original solution is 25 to 50% by weight of the diluted solution. If the casting solution is diluted too much, a microporous matrix will not be formed filling the pores of the substrate, but would only coat the walls of the pores in the substrate.

When the casting solution of example II, diluted to 50% by weight with acetone as the diluent, was cast into a macroporous substrate in the form of a sheet 1/16" thick having an average pore size of 83 microns and a pore volume of 40%, in accordance with the above described process, the resulting structure was hydrophobic and exhibited a bubble point pressure of 3.6" of water, again using #4 fuel oil as the bubble point fluid. The air flow rate was measured to be 3 standard cubic feet per minute and the water flow rate was measured to be 0.45 gallons per minute again measured over a circular area of 25 millimeters in diameter and with a pressure differential of 10 PSi. The filtration efficiency on the standard filtration test mixture was measured to be 58.6%.

The above described specific examples are preferred embodiments of the invention and it will be understood that variation in the parameters from these specific examples can result in a porous structure with different properties but will still result in a product within the invention. For example, N,N dimethyl formamide was chosen for the solvent because it is completely miscible with water, is of low cost, is well documented on its properties, and is safest with respect to its toxicity. Alternatively, other solvents having a low volatility could be used, such as N,N dimethyl acetamide, dimethylsulfoxide, hexamethylphosphoramide, or N methyl-2-pyrrolidone. Water is used in the extraction processes because of its low cost and accordingly, a pore former which was water soluble was selected. Other pore formers which could be used are polyvinyl alcohol, carboxymethylcellulose, or corn starch.

By varying the components of the casting solution including the amount of diluent if any, and the size of the pores in the substrate, different flow rates and different filtration efficiencies may be obtained. For a selected filtration efficientcy, different flow rates can be obtained. Thus, the porous structure of the invention can be designed to meet the requirements of many different applications.

The temperature of the casting solution during the water imbibing step affects the rate of the imbibition of water vapor by the solution. This rate in turn, affects formation of the microporous matrix via the phase inversion process. If the temperature is too high, this will slow the rate of imbibition and phase inversion will not occur within a reasonable time frame if it occurs at all. If the temperature is too low, imbibition will be too rapid, resulting in a structure with large pores with premature gelation. Too low a temperature also could cause moisture condensation on the casting surface causing premature coagulation. The water vapor content and the temperature of the atmosphere during the inhibition affects the phase inversion process. If the relative humidity is too low, the phase inversion process is prolonged, possibly indefinitely. With higher relative humidity, the inversion process occurs more quickly which will result in larger pores in the microporous porous matrix. If the relative humidity is too high, the pore size in the microporous matrix will become too large.

When the casting solution is cast into the network of macropores in the substrate, and as it imbibes water from the atmosphere, the solution becomes opaque indicating that phase inversion is occurring. When the solution becomes completely opaque and has formed a skin or film posessing some structural integrity, the inversion process has been completed. Accordingly, shortening the stand time during the imbibition step of the process will prohibit adequate formation of the microporous matrix, whereas lengthening the stand time will have no significant effect.

The temperature of the extraction fluid is somewhat critical with respect to obtaining a structure with predictable parameters. The temperature should be nearly the same as the casting surface temperature so as to minimize any thermal shock to the phase inverted casting solution when it is immersed in the water bath for coagulation of the microporous matrix and subsequent extraction of the solvent and pore former. Too high a temperature of the extraction fluid, e.g., above 100° F., or too low a temperature for the extraction fluid, less than 80° F., will cause abnormal coagulation of the microporous matrix, and thus, shift the parameters of the resulting microporous matrix produced outside of their normal ranges.

Ideally, when the macroporous substrate with the phrase inverted casting solution impregnated therein is immersed in the extraction fluid, the extraction fluid should be stagnant. After about 5 minutes, circulation of the extraction fluid can be initiated so as to expedite extraction of the solvent and the pore former. If the extraction fluid bath is circulating when the impregnated substrate is first immersed into the bath, the water currents will cause uneven coagulation of the surface of the microporous matrix to cause parameters of the microporous matrix to vary across the surface of the substrate. The drying conditions after extraction of the solvent in the pore former, for example temperature, relative humidity and rate of circulation are not critical. However, a clean environment is important to prevent deposition of dust particles on the structure.

The above description is of a preferred embodiment of the invention and modification may be made thereto without departing from the spirit and scope of the invention, which is defined in the appended claims.

What is claimed is:

1. A porous structure comprising a macroporous substrate defining an interconnected network of macropores and a microporous matrix defining a network of interconnected micropores filling and contained entirely within said network of macropores so that outside edge of said microporous matrix is at the outside surface of said substrate.

2. A porous structure as recited in claim 1, wherein the material of said substrate and the material of said microporous matrix consists essentially of synthetic resin.

3. A porous structure as recited in claim 1, wherein said macroporous sustrate consists of a first synthetic resin and said microporous matrix consists of a second synthetic resin different than said first synthetic resin.

4. A porous structure as recited in claim 1, wherein said macroporous substrate consists essentially of polyethylene and said microporous matrix consists essentially of polyvinyl chloride.

5. A porous structure as recited in claim 1, wherein said microporous matrix is formed within said network of macropores.

6. A porous structure as recited in claim 1, wherein said microporous matrix is formed within said network of macropores by impregnating said network of macropores with a solution of the material of said microporous matrix and a solvent for said material of said microporous matrix and by forming said microporous matrix from said solution.

7. A method of making a porous structure comprising providing a macroporous substrate defining a network of interconnected macropores, filling said network of macropores with a solution including a material capable of being formed into a microporous matrix from said solution while leaving none of said solution on the surface of said substrate, and forming a microporous matrix of said material from said solution entirely within said network of macropores.

8. A method as recited in claim 7, wherein said solution further comprises a pore former and a solvent for said pore former and for said material, and said step of forming said microporous matrix includes coagulating said material in said solution into a matrix and extracting said pore former and said solvent from said matrix.

9. A method as recited in claim 7, wherein said step of impregnating said macroporous substrate with said solution includes immersing said substrate in said solution in a vacuum chamber and oscillating the pressure in said chamber up and down below atmospheric pressure.

10. A method as recited in claim 7, wherein said step of forming a macroporous matrix includes the step of causing said solution while contained in network of micropores to imbibe moisture from the surrounding atmosphere.

11. A method as recited in claim 10, wherein the imbibing of water by said solution causes said solution to separate into two phases, a first phase being rich in said material and a second phase being rich in water, and wherein said first phase is coagulated into said microporous matrix.

12. A method as recited in claim 7, wherein said solution further comprises a solvent for said material and a diluent homogenously miscible with said solvent and in which said material is not soluble.

* * * * *